United States Patent Office 3,210,324
Patented Oct. 5, 1965

3,210,324
BENZENEPHOSPHORUS DICHLORIDE AND BENZENEPHOSPHORUS OXYDICHLORIDE AS ACTIVATORS FOR THE POLYMERIZATION OF PYRROLIDONE
William B. Black, Decatur, Ala., assignor, by mesne assignments, to Monsanto Company, a corporation of Delaware
No Drawing. Filed Sept. 25, 1958, Ser. No. 763,209
9 Claims. (Cl. 260—78)

This invention relates to a new process for polymerizing pyrrolidone. More particularly, the invention is concerned with a new polymerization procedure for the manufacture of pyrrolidone polymers, wherein new catalyst activator systems are employed.

Pyrrolidone is normally polymerized in the presence of a polymerization catalyst, such as the alkali metals and various organic metallic compounds, as well as sodium amide, calcium oxides and hydroxides, and the like. It has been found that the activity of these catalysts during the polymerization reaction can be enhanced by the addition thereto of various compounds which are classed as polymerization activators. For example, among the compounds heretofore proposed as polymerization activators, there may be named the acyl compounds, such as acetyl pyrrolidone, acetyl morpholone, benzoyl chloride and the like; lactones, such as gamma butylrolactone, and the like; alkyl esters of mono- and dicarboxylic acids, such as ethyl actate, ethyl oxalate, and the like; and the esters of polyhydric alcohols, such as ethylene glycol diacetate, and the like. However, the presently known catalyst-activator systems for the polymerization of pyrrolidone leave much to be desired.

Many of the compounds heretofore proposed as polymerization activators for pyrrolidone polymerization are difficult to handle, which obviously makes them undesirable from a commercial standpoint. Furthermore, many of the prior art compounds proposed as activators tend to affect the polymers as they are formed, resulting in undesirable color and detrimental changes in physical properties of the polymers. Moreover, many of the prior art activators result in the production of polymers having relatively low specific viscosities. Shaped articles, such as fibers, for example, formed from such polymers are weak and cannot be drawn to any given degree. Accordingly, there has been a need in the art for a catalyst-activator system which overcomes the above disadvantages and which is easily and readily adaptable to a commercial operation.

It is the principal object of the present invention to provide new catalyst-activator systems for the polymerization of pyrrolidone. It is another object of the invention to provide new catalyst-activator systems for the polymerization of pyrrolidone which result in the formation of polymers having desirable improved physical properties, such as good solubility, excellent color and high molecular weight. It is a further object of the invention to provide a new process for preparing pyrrolidone polymers. Others objects and advantages of the invention will be apparent from the description thereof hereinafter.

In general, the objects of the invention are accomplished by polymerizing monomeric pyrrolidone under polymerization conditions in the presence of a polymerization catalyst and activating the polymerization with a compound selected from the group consisting of phosphorous trichloride, phosphorous pentachloride, phosphorous oxychloride, benzenephosphorous dichloride, benzenephosphorous oxydichloride, and thionyl chloride.

The polymerization activators can be employed with any of the known catalysts normally used in the polymerization of monomeric pyrrolidone. Among the catalysts for polymerizing pyrrolidone which are useful in the practice of the present invention are the alkali metals, that is, sodium, potassium, and lithium; the hydrides, hydroxides, oxides, and salts of the alkali metals, that is, such salts as sodium, potassium, and lithium pyrrolidone; organic metallic compounds, preferably those which are strongly basic, for example, the lithium, potassium, and sodium alkyls and aryls of the alkali metals, such as sodium phenyl and the like; sodium amide, and other catalysts.

Preparation of polypyrrolidone with the activators of this invention may be carried out with varying amounts of components. In general, the chemical equivalent amount of catalyst must exceed by at least a slight excess the number of chemical equivalents of activator. The catalyst may be employed in a range of 0.002 to 0.25 chemical equivalent of catalyst based upon one mole of monomeric pyrrolidone. It is preferred, however, that the catalyst be employed in a range of 0.005 to 0.25 chemical equivalent of catalyst based upon one mole of monomeric pyrrolidone. The activator is employed in a range of 0.0001 to 0.075 chemical equivalent of activator based upon one mole of monomeric pyrrolidone. Preferably, however, the activator is employed in a range of 0.001 to 0.075 chemical equivalent of activator based upon one mole of monomeric pyrrolidone. Thus, for activators containing more than one potentially reactive substituent, the maximum number of moles of activator that can be employed for a given number of moles of catalyst must be considerably less than the number of moles of catalyst. For example, where one mole of benzenephosphorous dichloride, two chemical equivalents, is employed in carrying out the polymerization, a slight excess of two moles, two chemical equivalents, of catalyst is required.

The polymerization reaction of this invention is carried out at temperatures within a range of −70° C. to 100° C. In the preferred practice of the invention, however, the polymerization reaction is carried out at a temperature in the range of 20° C. to 70° C. The reaction time will vary with the temperature and the amount of monomer employed. Where higher temperatures are used in the polymerization reaction, the total time required to complete polymerization is shorter. The polymerization period is also greatly affected by the particular catalyst-activator system employed. Generally, in carrying out a polymerization reaction according to the present invention, the monomer, catalyst, and activator are placed in a polymerization vessel and subjected to polymerization temperatures as hereinabove defined. However, the steps necessary to obtain complete polymerization will vary, depending upon the type of catalyst which is employed. For example, many of the catalysts, such as potassium hydroxide, cause the formation of water during the polymerization reaction. The presence of such water has a deleterious effect upon the polymerization reaction, namely, it hinders further polymerization and even brings the same to a halt in many instances. Accordingly, in order to achieve the desired results, it is necessary to remove such water of reaction from the reaction medium. This can easily be accomplished by a simple vacuum distillation. Therefore, when employing a catalyst, such as sodium hydroxide, the monomeric pyrrolidone is placed in the polymerization vessel and the catalyst added thereto. The reactants are then subjected to vacuum distillation and mechanical stirring in order to remove the water formed. Although mechanical stirring is not absolutely necessary, it greatly aids in removal of the water. When all of the water in the reaction vessel is completely removed, the activator is then added to the reaction mixture and the reaction continued. When an alkali hydride is employed as the catalyst, all of the reactants may be added to the polymerization vessel simultaneously, and thereafter the reaction carried through to completion. However, it is preferred to add the alkali hydride to the monomer in the reaction vessel and then remove the hydrogen thus generated prior to the addition of the activator to the reaction mass. This procedure eliminates all danger of any possible explosive results due to the presence of hydrogen in the reaction vessel. An advantage in the use of an alkali hydride over the water-forming catalyst, such as potassium hydroxide, is the elimination of the distillation step necessary for the removal of the water of reaction, since with hydrides a pyrrolidone salt and gaseous hydrogen are formed.

The instant method for polymerizing pyrrolidone may be carried out by either solution, emulsion, suspension or bulk polymerization techniques. The solution and emulsion polymerizations may be either batch or continuous methods. When solution polymerization is employed, the monomeric pyrrolidone is dissolved in a solvent such as 1,4-dioxane. The desired catalyst and activator are added to the solution and the polymerization is carried out under the proper conditions. Well-known solution polymerization apparatus is suitable for carrying out the methods employed in the practice of this invention. When applying emulsion or suspension polymerization procedures to the preparation of polypyrrolidone with the activators of the invention, the monomer containing the catalyst is dispersed in a known solvent therefor, such as petroleum ether, containing an emulsifying agent. Subsequently, the desired activator is added to the dispersion and the reaction mixture is subjected to polymerization conditions. A suitable coagulant is then added to the polymerized mixture in order to precipitate the polymer. A suitable emulsifying agent which may be employed is sodium lauryl sulfate, and a suitable coagulant is phosphoric acid.

While it is not positively known exactly what takes place when pyrrolidone is polymerized in accordance with the present invention, it is believed that the polymerization is accomplished by first forming ionic pyrrolidone salts. For example, when one employs potassium hydroxide as a catalyst, a reversible reaction takes place between the monomeric pyrrolidone molecules and the hydroxide ion, with the subsequent formation of water. Since this reaction is reversible, it is necessary that the water be removed in order to carry out polymerization. Formation of the pyrrolidone anion results in an electron distribtuion which is nucleophilic. In order for chain propagation to take place, the nucleophilic ion attaches to a pyrrolidone ring which has been activated by an activator molecule, thereby causing a weak bond in the ring between the nitrogen and the carbonyl group, and causing the ring to open, forming a newly activated position and an anion on the polymer chain. A proton (hydrogen ion) from a monomeric pyrrolidone transfers to the chain anion resulting in a phosphorous-nitrogen or sulfur-nitrogen linkage and the regeneration of a nucleophilic pyrrolidone anion to further catalyze the reaction. The catalyst is continuously consumed and generated throughout the entire reaction by the transfer of a proton (hydrogen ion) giving rise to the formation of the pyrrolidone anion. It is believed that the function of an activator is to activate the pyrrolidone monomer by displacing the hydrogen on the nitrogen atom of the pyrrolidone ring, thereby causing an electrophilic state within the monomeric pyrrolidone molecule, such that the bond between the nitrogen atom and the carbonyl group of the ring is broken when such molecule is attacked by a pyrrolidone anion, thereby forming a straight chain. Such chain is attached to a pyrrolidone ring by bonding to the nitrogen atom there. The ring structure is in turn opened by the attack of a nulleophilic pyrrolidone ion formed by the transfer of a proton from a monomeric pyrrolidone molecule to a chain nitrogen. Irrespective of whether or not the above theory is correct, the use of the activators defined herein, to activate the polymerization of pyrrolidone, has produced unexpectedly good results.

Polypyrrolidone prepared with the activators of this invention has a melting point of about 260° C. and is soluble in formic acid, mixtures of formic acid and water, and all of the known solvents for polypyrrolidone. It is particularly adapted for use in the manufacture of shaped articles, such as filaments, fibers, films, rods, bristles and the like. Lower molecular weight polymers prepared in the same manner may be employed in the manufacture of coatings or lacquers.

Where the polypyrrolidone is to be employed in the formation of filaments, fibers, and the like, there are various methods known for filament and fiber formation. These methods include the melt spinning, dry spinning and wet spinning methods. Where the wet spinning method is employed, the polymer is dissolved in a suitable solvent and subsequently spun from the solution into a coagulating bath. In the dry spinning method, the polymer is dissolved in a volatile solvent and extruded into a heated atmosphere in order to remove the solvent. The melt spinning method involves melting the polymer under temperature and pressure and extruding the melt through a spinneret into the atmosphere.

Shaped articles which have a modified appearance or modified properties may be prepared from the polypyrrolidone whose polymerization has been activated by the activators of the instant invention. Various reagents to accomplish the desired effect include plasticizers, pigments, dyes, antistatic agents, fire-retarding agents and the like.

The following examples are intended to illustrate the invention more fully but are not intended to limit the scope thereof, for it is possible to effect many modifications therein. In the examples, all parts and percents are by weight unless otherwise indicated.

*Example 1*

To 132 grams of highly purified pyrrolidone having a moisture content of 0.02 percent, there was added 5.56 grams of 85 percent potassium hydroxide, equivalent to 4.72 grams (0.084 mole) of pure potassium hydroxide. Approximately 34 grams of pyrrolidone containing the water of reaction was distilled off of the reaction mixture under a vacuum of 2 mm., leaving 103 grams of pyrrolidone and potassium pyrrolidone.

The 103 grams of reaction mixture was divided into four equal parts of 25.75 grams each. Each 25.75 gram portion contained 0.294 mole of pyrrolidone of which 0.021 mole was present as the potassium derivative.

To one 25.75 gram portion, there was added 0.436 ml. (0.570 gram or 0.00318 mole) of benzenephosphorous dichloride. The reaction mixture was then stoppered to protect it against the atmosphere. The reaction mixture became moderately hot and semi-solid in about 5 minutes. After 24 hours at approximately 25° C. the product was a very hard pure white cake. The cake was broken up and ground in a Wiley mill to a fineness sufficient to pass through a 20 mesh screen. The polymer powder was washed in a Waring Blendor, first with water and then with acetone. After each was the power was filtered. Subsequently, the polymer was air-dried to constant weight. There was obtained 18.1 grams or a 72 percent yield based on the theoretical yield of 25 grams. The specific viscosity of a 0.5 percent by weight solution of the polymer in 90 percent formic acid was 1.304. The polymer was unusually white indicating that benzenephosphorous dichloride is especially advantageous in obtaining polymers of good color.

The above results wherein benzenephosphorous dichloride was used to activate the polymerization of monomeric pyrrolidone are to be contrasted with the results obtained by letting a second 25.75 gram portion of the pyrrolidone, potassium pyrrolidone mixture stand at 25° C. for 24 hours without the addition of an activator. This portion resulted in a yield of only 1 gram or 4 percent of polypyrrolidone.

Example II

To 20 grams of highly purified pyrrolidone having a moisture content of less than 0.1 percent, there was added approximately 0.2 gram (approximately 0.008 mole) of sodium hydride. When the evolution of hydrogen gas was completed, 5 drops (approximately 0.0015 mole) of benzene phosphorous dichloride was added to the reaction vessel. After the addition of benzenephosphorous dichloride, the reaction mixture was vigorously agitated. It become hot immediately was was semi-solid after approximately 5 minutes. After standing for 3 days at approximately 25° C. the reaction mixture was a very hard white polymer cake. As in the previous example, the unusual whiteness of the polymer obtained using the benzenephosphorous dichloride activator indicates that it is particularly advantageous in obtaining polymers having excellent color.

Example III

To 20 grams of highly purified pyrrolidone having a moisture content of less than 0.1 percent, there was added approximately 0.2 gram (approximately 0.008 mole) of sodium hydride. When the evolution of hydrogen gas was completed, 5 drops (approximately 0.0023 mole) of phosphorous trichloride was added to the reaction vessel with vigorous shaking. The reaction mixture became hot and was semi-solid in 5 minutes. After 4 hours, the reaction mixture was almost completely solid. Upon standing for 3 days at approximately 25° C., there was a very hard white polymer cake. The polymer was usually white upon visual inspection indicating that phosphorous trichloride is a decidedly advantageous activator in the production of polypyrrolidone having excellent color.

Example IV

To approximately 25 grams of highly purified pyrrolidone having a moisture content of 0.02 percent, there was added approximately 0.2 gram (approximately 0.008 mole) of sodium hydride. Upon completion of the evolution of hydrogen gas, 5 drops (approximately 0.0022 mole) of phosphorous oxychloride was added to the reaction vessel with vigorous shaking. A noticeable amount of heat was evolved. The reaction mixture became a slush after 5 minutes, a gel-slush after 1 hour, and a moderately hard polymer cake after standing for 3 days at approximately 25° C. As in the previous examples, the polymer activated with phosphorous oxychloride had a decidedly good white color.

Example V

To approximately 25 grams of highly purified pyrrolidone having a moisture content of 0.02 percent, there was added approximately 0.2 gram (approximately 0.008 mole) of sodium hydride. When the evolution of hydrogen gas was completed, 5 drops (approximately 0.0028 mole) of thionyl chloride was added to the reaction mixture with vigorous shaking. A noticeable amount of heat was evolved. The reaction mixture became a slush after 3 minutes at 25° C. and a hard white polymer cake after 3 days.

Example VI

To 25.0 grams (0.294 mole) of highly purified pyrrolidone having a moisture content of 0.02 percent, there was added 0.50 gram (0.0210 mole) of sodium hydride. Upon completion of the hydrogen gas evolution, 0.50 ml. (0.00355 mole) of benzenephosphorous oxydichloride was added with vigorous shaking of the reaction mixture. The reaction mixture became quite hot very quickly. The reaction mixture was semi-solid in two minutes and in two hours it was a moderately hard polymer cake. After the reaction mixture stood at approximately 25° C. for 24 hours, it was a very hard, very white polymer cake.

The new activators of the present invention present many advantages over those known in the prior art. For example, polypyrrolidone prepared in the presence of these new activators has a greatly increased specific viscosity as well as good color. Furthermore, extremely good yields of polymer are obtained in polymerization procedures where the new activators are used. At the same time that the new activators of this invention result in the formation of polypyrrolidone which has greatly improved properties, the other physical characteristics of the polymer, such as solubility, for example, are not affected. In addition, the use of the new activators disclosed herein decreases materially the amount of time necessary to carry a pyrrolidone polymerization to completion. The new activator compounds are also readily available and inexpensive and may be employed without substantial changes in existing equipment used for pyrrolidone polymerization. Numerous other advantages will be apparent to those skilled in the art.

As many apparently widely different embodiments of this invention may be made without departing from the spirit and scope thereof, it is to be understood that the same is not to be limited to the specific embodiments thereof except as defined in the appended claims.

I claim:

1. A process for polymerizing pyrrolidone which comprises forming under essentially anhydrous conditions a mixture containing monomeric pyrrolidone, a catalyst selected from the group consisting of alkali metals, pyrrolidone salts of alkali metals, hydrides of alkali metals, and alkali metal aryls and alkyls, and a polymerization activator selected from the group consisting of benzenephosphorous dichloride and benzenephosphorous oxydichloride, said catalyst being employed in a range of 0.002 to 0.25 chemical equivalent of catalyst based upon one mole of monomeric pyrrolidone, said chemical equivalent being based upon the gram-molecular weight of the catalyst divided by the valence of the metal element of said catalyst, and said activator being employed in a range of 0.0001 to 0.075 chemical equivalent of activator based upon one mole of monomeric pyrrolidone, said chemical equivalents being based upon the gram-molecular weight of the activator divided by the number of chlorine atoms in said activator, with a slight excess of catalyst over activator being present in said mixture, and subjecting said mixture to a temperature in the range of −70° C. to 100° C.

2. A process for polymerizing pyrrolidone which comprises forming under essentially anhydrous conditions a mixture containing monomeric pyrrolidone, a catalyst selected from the group consisting of alkali metals, pyrrolidone salts of alkali metals, hydrides of alkali metals, and alkali metal aryls and alkyls, and a polymerization activator selected from the group consisting of benzenephosphorus dichloride and benzenephosphorous oxydichloride, said catalyst being employed in a range of 0.005 to 0.25 chemical equivalent of catalyst based upon one mole of monomeric pyrrolidone, said chemical equivalent being based upon the gram-molecular weight of the catalyst divided by the valence of the metal element of said catalyst, and said activator being employed in a range of 0.001 to 0.075 chemical equivalent of activator based upon one mole of monomeric weight of the activator divided by the number of chlorine atoms in said activator, with a slight excess of catalyst over activator being present in said mixture, and subjecting said mixture to a temperature in the range of 20° C. to 70° C.

3. The process as defined in claim 2 wherein the polymerization activator is benzenephosphorous oxydichloride.

4. The process as defined in claim 1 wherein the polymerization activator in benzenephosphorous dichloride.

5. The process as defined in claim 1 wherein the polymerization activator is benzenephosphorous oxydichloride.

6. The process as defined in claim 2 wherein the polymerization activator is benzenephosphorous dichloride.

7. A process for polymerizing pyrrolidone which comprises forming under essentially anhydrous conditions a mixture containing 0.294 mole of monomeric pyrrolidone, 0.0210 chemical equivalent of sodium hydride, said chemical equivalent being based upon the gram-molecular weight of sodium hydride divided by the valence of sodium, and 0.00710 chemical equivalent of benzenephosphorous oxydichloride, said chemical equivalent being based upon the gram-molecular weight of benzenephosphorus oxydichloride divided by the number of chlorine atoms in benzenephosphorous oxydichloride, and subjecting the mixture to a temperature of 25° C.

8. A process for polymerizing pyrrolidone which comprises forming under essentially anhydrous conditions a mixture containing 0.294 mole of monomeric pyrrolidone, 0.021 chemical equivalent of potassium pyrrolidone, said chemical equivalent being based upon the gram-molecular weight of potassium pyrrolidone divided by the valence of potassium, and 0.00636 chemical equivalent of benzenephosphorous dichloride, said chemical equivalent being based upon the gram-molecular weight of benzenephosphorous dichloride divided by the number of chlorine atoms in benzenephosphorous dichloride, and subjecting the mixture to a temperature of 25° C.

9. A process for polymerizing pyrrolidone which comprises forming under essentially anhydrous conditions a mixture containing 0.235 mole of monomeric pyrrolidone, 0.008 chemical equivalent of sodium hydride, said chemical equivalent being based upon the gram-molecular weight of sodium hydride divided by the valence of sodium, and 0.003 chemical equivalent of benzenephosphorous dichloride, said chemical equivalent being based upon the gram-molecular weight of benzenephosphorous dichloride divided by the number of chlorine atoms in benzenephosphorous dichloride, and subjecting the mixture to a temperature of 25° C.

References Cited by the Examiner

UNITED STATES PATENTS 2,739,959  3/56  Ney et al. _____ 260—78

OTHER REFERENCES

Noble: Doctoral Dissertation Series, Publ. No. 22,623 (1956), pp. 40–48. (Copy in Div. 60.)

WILLIAM H. SHORT, *Primary Examiner.*

MILTON STERMAN, HAROLD N. BURSTEIN, PHILIP E. MANGAN, WILLIAM H. SHORT, *Examiners.*